Aug. 28, 1956　　H. H. CHAMBERLAIN ET AL　　2,761,005
NON-CARBONIZING THERMOCOUPLES
Filed Jan. 27, 1954
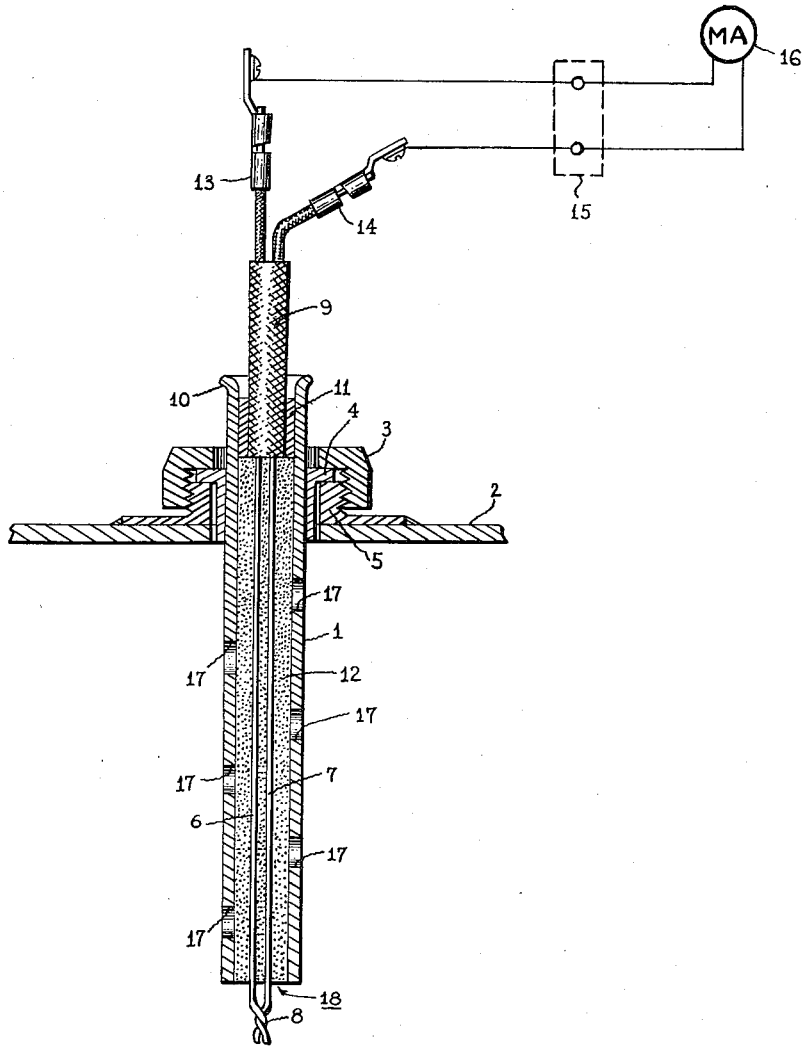
Inventor:
HARVEY H. CHAMBERLAIN
SAMUEL A. BALABAN
by, Richard E. Hosley
His Attorney

United States Patent Office 2,761,005
Patented Aug. 28, 1956

2,761,005

NON-CARBONIZING THERMOCOUPLES

Harvey H. Chamberlain, Marblehead, and Samuel A. Balaban, Madeira, Mass., assignors to General Electric Company, a corporation of New York Application January 27, 1954, Serial No. 406,549

6 Claims. (Cl. 136—4)

The present invention relates to improved thermocouples for measuring fluid temperatures, and, more particularly, to high temperature thermocouples which preclude carbonization of fluids therein.

Measurements of temperatures within high-temperature power plants such as aircraft gas turbines are customarily made with thermocouples having conductors sheathed in a cylindrical metallic housing or barrel, tightly packed with refractory insulating powder or a substantially solid ceramic core. Such thermocouples are necessarily of the most rugged construction, to avoid rapid deterioration under extreme vibration and temperature conditions. However, the thermocouple junction of these conductors in these temperature detectors extends beyond the end of the outer metallic housing through an opening in the end of the housing, and the somewhat porous insulating core may thus be exposed to the fuel. When this occurs, the fuel penetrates the core and is drawn into the upper portions of the barrel, where subsequent rapid heating carbonizes the fuel. The result of this carbonization may be a destructive reduction of resistance between the conductors and sheath from an original value of the order of 3 to 4 megohms to a wholly intolerable value as low as 1 ohm. Thermocouple life is relatively short at best, because of enormous temperatures and vibrations which must be withstood, and it is of the utmost consequent importance that resistance failures be avoided.

Accordingly, it is one of the objects of our invention to provide improved high-temperature thermocouples which preclude fuel carbonizations and attendant destructions of insulation resistances.

A further object is to provide improved thermocouples having wholly reliable and yet the simplest and most inexpensive provisions for insuring that fuels absorbed therein will volatilize without carbonization.

By way of a summary account of one aspect of this invention, there is provided a core of insulating material within a tubular metallic thermocouple housing and surrounding a pair of spaced thermocouple conductors which project beyond one end of the core and housing to form a thermocouple junction. The opposite end of the housing is closed by terminal provisions for a thermocouple cable, and mounting apparatus is also disposed near that end to support the free junction end in a fluid stream which is subject to temperature measurement. Whereas past unsuccessful efforts to eliminate carbonization problems have been of the expected nature, that is, have entailed attempts at non-porous sealing of the junction end of the housing and impregnation of the thermocouple with some substance which would make it impervious to entrance of fuel, we have succeeded in solving carbonization difficulties by the very simple structural arrangement which comprises a perforated tubular housing in place of the usual closed-surface housing in the aforementioned type of assembly. This unorthodox construction appears to accentuate the danger of carbonization, inasmuch as the fuel may thus permeate the core more readily than in prior devices, but, surprisingly, the perforated housing also permits the absorbed fuel to volatilize and escape almost instantaneously and before it can carbonize. Accordingly, a thermocouple constructed in this form may be saturated with kerosene and may then be subjected to an immediate high-temperature blast of ignited mixture, but the kerosense therein will simply vaporize and be vented from the housing instantly and without occasioning a lowering of the core resistance.

Aforementioned and other objects and features of this invention may be noted in greater detail in the following description wherein reference is made, by way of example, to the single figure of the drawing illustrating a partially cross-sectioned and partially pictorial view of a thermocouple assembly embodying our invention.

Referring to the drawing, the tubular thermocouple barrel or housing 1 is shown installed by a mounting through an aperture in the wall 2 of a gas turbine power plant or of any chamber containing a fluid under measurement. This mounting includes a nut 3 having an internal annular flange which bears against a flange 4 fixed to one end of the thermocouple casing 1. Flange 4 in turn rests on an externally-threaded mounting member 5 which is welded to the chamber wall 2 in a gas-tight relationship. Tubular casing 1 may be made of stainless steel or other suitable material, and a pair of thermocouple conductors 6 and 7 of dissimilar metals run longitudinally through this casing, terminating in a protruding junction 8 at one end and in connections with an insulated coupling cable 9 at the mounting end. An outward flaring 10 of casing 1 protects cable 9 from abrasion, and a plug bushing 11 serves to fix the cable firmly in position and seal the outer end of the casing.

Dissimilar conductors 6 and 7 may be of the type commonly employed in thermocouple pyrometry where temperatures up to about 1000° C. are to be experienced, one being a nickel-chromium alloy (90 per cent nickel and 10 per cent chromium) and the other being a nickel-aluminum alloy also containing small amounts of manganese and silicon (95 per cent nickel, 2 per cent aluminum, 2 per cent manganese, and 1 per cent silicon). Junction 8 may be rendered secure by welding. Insulation and positioning of conductors 6 and 7 is achieved by a core 12, which is preferably comprised of an insulating powder rammed into place in casing 1 and extending fully between the conductors and the internal surface of the casing. Suitable powders include magnesia or alumina, for example. Fused cores are less desirable than those of solidly packed minute particles because the latter are less susceptible to destruction by vibration, provide more of a vibration cushioning for the insulated conductors, and have low thermal conductivity. In addition to the ram packing of powder into the casing 1, a swaging operation is often performed on the packed casing, whereby the high pressures applied during swaging further cause a solidification of the insulation which prevents it from flaking out of position.

Cable terminals 13 and 14 are shown coupled to a reference junction 15 and a remote milliammeter or other suitably calibrated temperature indicating instrument 16. While ordinarily the reference junction 15 is merely situated such that it is protected from the high temperatures under measurement, an ice point or other conventional reference temperature may be provided to realize greater accuracies.

Our casing or housing 1 does not have the uninterrupted surface found on prior thermocouples, and, instead, possesses a number of relatively small apertures 17 extending through its side walls. These apertures are of dimensions small enough such that they will not materially lessen the structural strength which the casing must have to withstand sever vibrations and such that the densely packed insulating powder 12 will not be easily shaken out of the casing. The spacing and shaping of these apertures is further critical in the requirement that there be an aperture within a sufficiently short distance from each point in the insulation 12 to permit absorbed liquid fuel to be volatilized and fully vented through an aperture before it can be carbonized. Prior unperforated casings were also required to have an open end, such as 18, to maintain the necessary insulation resistance near the thermocouple junction exposed to the temperature conditions under measurement. Porosity of the insulation 12 resulted in absorption of liquid fuel, and a destructive carbonization ensued when the temperature rose sharply. Although our vents or apertures 17 enable an even greater absorption of liquid fuel, and this has hitherto been avoided with the greatest care, the eased ingress of liquid fuel is more than matched by the rapid escape of the volatilized fuel. When excellent insulating fuels such as kerosene are used, that liquid which penetrates the thermocouple occasions no insulation problems.

Preferably, the vent provisions appear only along the housing surfaces on the interior of the wall 2, else openings outside would permit the undesirable escape of dangerous gas outside the walls of the power plant. While it might appear that carbonization would thus occur within the upper portions of the thermocouple, it has been found that the temperatures outside the wall 2 are ordinarily low enough to preclude carbonization. Should this be found untrue in other installations, further venting passages may be provided through the side walls of casing 1, and through the casing flange 4, to afford an additional escape path.

In one embodiment, holes 17 having a diameter of 0.062 inch were drilled through casing 1, at about the positions illustrated, with excellent results. However, longitudinal slots, or perforations of other types, will perform satisfactorily.

Although this invention has been described by reference to particular embodiments thereof, it will be understood by those skilled in the art that numerous modifications and substitutions may be effected without departing either in spirit or scope from this invention in its broadest aspects.

What we claim as new and desire to secure by Letters Patent of the United States is:

1. A thermocouple for measuring gaseous fluid temperatures in a chamber wherein liquid fluids may be present, comprising a perforated tubular metallic housing, means for mounting said housing to project through an apertured wall of said chamber in a gas-tight relation with said wall, a pair of conductors of dissimilar metals extending through said housing and terminating in a thermocouple junction near the end of said housing within said chamber, a refractory insulating powder packed in said housing and extending fully between said conductors and the internal surfaces of said tubular housing, said packed powder being porous to fluids and means sealing the end of said housing outside said chamber, said perforated housing having a plurality of openings therethrough on the tubular surface thereof within said chamber disposed to vent volatilized liquid fluids to said chamber without carbonization of said liquid fluids in said powder under high temperature conditions.

2. A thermocouple for measuring gaseous fluid temperatures in a chamber wherein liquid fluids may be present, comprising a tubular metallic housing having at least one opening through the tubular surface thereof, means for mounting said housing to project through an apertured wall of said chamber in a gas-tight relation with said wall, a pair of conductors of dissimilar metals extending through said housing and terminating in a thermocouple junction near the end of said housing within said chamber, a porous insulating core in said housing extending fully between said conductors and internal surfaces of said tubular housing and positioning and insulating said conductors, and means sealing the end of said housing outside said chamber, said opening in said housing surface communicating the inside of said chamber with said core and venting volatilized fluids to said chamber without carbonization of said liquid fluids in said porous core under high temperature conditions.

3. A thermocouple for measuring gaseous fluid temperatures in a chamber wherein a liquid fluid may be present, comprising a tubular metallic housing having a plurality of vents through the surface thereof, means for mounting said housing to project through an apertured wall of said chamber in a gas-tight relation with said wall, a pair of thermocouple conductors extending through said housing and terminating in a thermocouple junction near an open end of said housing within said chamber, a core of insulating material in said housing extending fully between said conductors and internal surfaces of said tubular housing and positioning and insulating said conductors, said insulating core being of material which absorbs said liquid fluid, and means substantially sealing the end of said housing outside said chamber, said vents through said housing surface being disposed to permit egress of volatilized liquid fluid from said core into the interior of said chamber without carbonization in said core.

4. A thermocouple for measuring gaseous fluid temperatures in a chamber wherein a liquid fuel having a high insulation resistance may be present, comprising a tubular metallic housing having a plurality of small holes drilled through the surface thereof, means for mounting said housing to project through an apertured wall of said chamber in a gas-tight relation with said wall, a pair of thermocouple conductors of dissimilar metals extending through said housing and terminating in a thermocouple junction near an open end of said housing within said chamber, a refractory insulating powder packed in a porous mass between internal surfaces of said housing and said conductors to position and insulate said conductors in said housing, and cable and plug means substantially sealing the end of said housing outside said chamber, said drilled holes in said housing surface being disposed along that portion of said housing within said chamber which is subject to temperatures at which said liquid fuel may carbonize and venting volatilized fluids to said chamber without carbonization of said fuel in said porous packed powder under high temperature conditions.

5. Apparatus for measuring gaseous fluid temperatures in enclosures wherein liquid fluids may be present, comprising a hollow metallic housing having a plurality of vent holes through the surface thereof, electrical conductors extended within said housing, temperature responsive means coupled with said conductors, and insulating powder packed in a porous mass between internal surfaces of said housing and said conductors to position and insulate said conductors, said housing having said vent holes dimensioned to preclude dislodging of said packed powder and spaced to permit violatilized fluid to escape from said porous packed powder under high temperature conditions.

6. Apparatus for measuring gaseous fluid temperatures in an enclosure wherein liquid fluids subject to carbonization may be present, comprising a tubular open-ended metallic housing having a plurality of small holes drilled through the surface thereof, a pair of thermocouple conductors of dissimilar metals extending through said housing and terminating in a thermocouple junction projecting from an open end of said housing, and a refractory insulating powder packed in a porous mass between internal surfaces of said housing and said conductors to position and insulate said conductors in said housing, said housing having said drilled holes dimensioned to preclude dislodging of said packed powder and spaced to permit volatilized fluid to escape from said porous packed powder outwardly through said drilled housing under high temperature conditions.

References Cited in the file of this patent

UNITED STATES PATENTS

| | | |
|---|---|---|
| 879,474 | Kessling | Feb. 18, 1908 |
| 1,422,672 | Coghlan | July 11, 1922 |
| 2,234,056 | Moore | Mar. 4, 1941 |
| 2,587,391 | Seaver | Feb. 26, 1952 |